3,726,639
FLAME-RESISTANT CELLULOSE AND PROCESS
FOR PRODUCING SAME
James B. Prentice, Batesville, Ind., Denzel Allan Nicholson, Springfield Township, Hamilton County, Ohio, and Ronald T. Amel, Whitewater, Wis., assignors to The Procter & Gamble Company, Cincinnati, Ohio
No Drawing. Filed Aug. 17, 1970, Ser. No. 64,627
Int. Cl. D06m 13/28, 13/44, 15/54; C09k 3/28
U.S. Cl. 8—115.7                                8 Claims

ABSTRACT OF THE DISCLOSURE

Flame-resistant cellulose is prepared by reacting cellulose with (1) (a) methylolmelamines or (b) melamine and 2–6 moles of formaldehyde per mole of melamine, and (2) (a) α-hydroxy phosphonates or (b) a mixture of dialkyl phosphites and certain carbonyl containing compounds at a temperature of from about 100 to about 200° C. for a period of time from about 2 minutes to an hour to provide a durable flame-resistant effect.

PRIOR ART

The application of methylolmelamines to cellulosic materials is known, but not in combination with either α-hydroxy phosphonates or combinations of materials capable of giving α-hydroxy phosphonates to give the unobvious result of durably flame-resistant cellulose.

THE INVENTION

This invention relates to the discovery that cellulosic materials can be made flame resistant by a process comprising the steps of:

(I) Contacting said cellulosic material with an aqueous solution containing:

(A) A phosphorus source selected from the group consisting of:

(1) From about 2% to about 80% of a compound having the formula

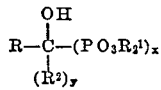

wherein R and $R^2$ are each selected from the group consisting of hydrogen, alkyl groups containing from 1 to about 6 carbon atoms, phenyl, acyl groups containing from 2 to about 6 carbon atoms, and acyl alkyl groups containing from 3 to about 6 carbon atoms; $R^1$ is an alkyl group containing from 1 to about 3 carbon atoms, $x$ is a number from 1 to 2; and $y$ is a number which when added to $x$ gives 2; and (2) A mixture of:

(a) from about 1% to about 40% of a carbonyl containing compound having the formula:

$$R^3—CO—R^4$$

wherein $R^3$ and $R^4$ are selected from the group consisting of hydrogen, phenyl, alkyl groups containing from 2 to about 6 carbon atoms, acyl groups containing from 2 to about 6 carbon atoms, and acyl alkyl groups containing from 3 to about 6 carbon atoms, the total number of carbon atoms in said compound being no greater than about 8; and (b) from about 1% to about 40% of a dialkyl phosphite, wherein said alkyl groups contain from 1 to 3 carbon atoms; and (B) From about 5% to about 50% of mixtures of melamine and from about 2 to about 6 moles of formaldehyde per mole of melamine;

(II) Drying said cellulosic material; and (III) Heating said cellulosic material to a temperature of from about 120° C. to about 200° C. for a time of from about 1 minute to about 1 hour to effect the cure and produce a durably flame-resistant cellulose.

The melamine-formaldehyde mixture

The melamine-formaldehyde mixture is essential since nitrogen is necessary in this process for producing flame-resistant cellulose. In addition, the phosphonate is attached to the melamine moiety and the methylol groups on the melamine moiety polymerize and attach the entire system to cellulose to provide durability.

Included within the term "mixtures of melamine and from about 2 to about 6 moles of formaldehyde per mole of melamine" are the products of such a mixture, including dimethylolmelamine, trimethylolmelamine, tetramethylolmelamine, pentamethylolmelamine, hexamethylolmelamine, mixtures of these methylolmelamines, mixtures of these melamines and formaldehyde or melamine or methylolmelamine. It is believed that all of these products are mixtures which contain varying amounts of the various species depending upon the ratio of melamine to formaldehyde.

Trimethylolmelamine is a commercially available material. However, it is possible to use formaldehyde and melamine as starting materials to form methylolmelamines in situ. Specific examples of useful melamine-formaldehyde mixtures appear in the examples.

In addition to aiding in the creation of a durable fire-resistant cellulosic material, the melamine-formaldehyde mixtures of this invention can provide a desirable permanent-press effect, if used in sufficient amounts, as known in the prior art.

α-Hydroxy phosphonates

The α-hydroxy phosphonates of this invention may be used as such, or, in place of the α-hydroxy phosphonates, one can use materials which when reacted together, either before the primary reaction, or in situ, will give α-hydroxy phosphonates. It is not known whether the same mechanism is involved in both situations. However, the end result is believed to be identical.

Suitable examples of α-hydroxy phosphonates which can be used include:

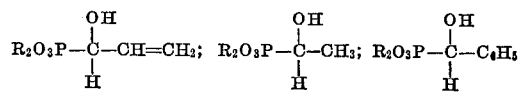

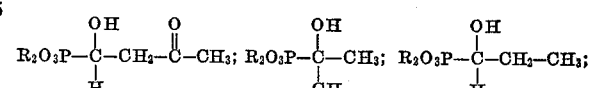

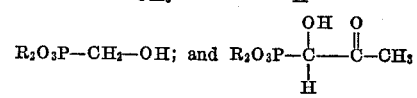

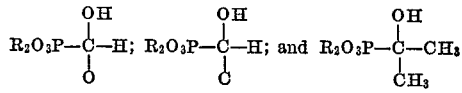

wherein the R's are short chain alkyls containing from 1 to 3 carbon atoms.

Preferred α-hydroxy phosphonates include:

wherein the R's are short chain alkyls.

Specific preferred examples of α-hydroxy phosphonates appear hereinafter in the Examples.

In place of the α-hydroxy phosphonates, it is possible to use materials which can react to form α-hydroxy phosphonates as known in the prior art. For example, carbonyl-containing compounds and dialkyl phosphites can react to form α-hydroxy phosphonates or can react to attach the α-hydroxy phosphonate to the methylolmelamine. The following reaction is an example of how such reactions can proceed:

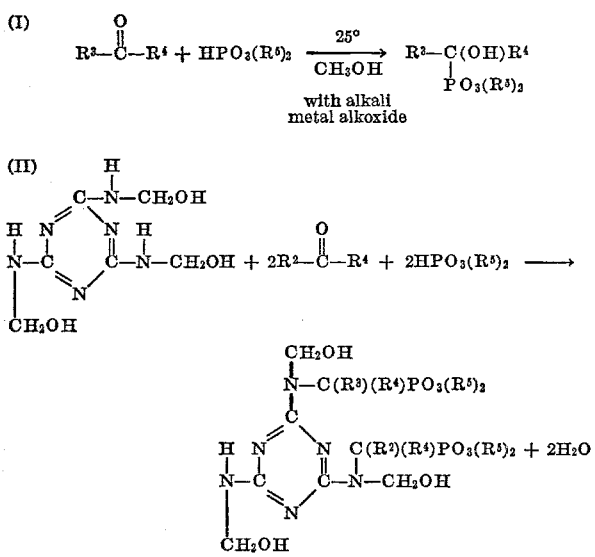

Suitable carbonyl containing reactants include acetone, benzaldehyde, propionaldehyde, methyl vinyl ketone, acetylacetone, and glyoxal.

The carbonyl containing reactant should preferably not contain too many carbon atoms, since they become water insoluble and increase the flammability of the cellulose. Preferred carbonyl containing reactants are formaldehyde, acetaldehyde, and acetone. The most preferred carbonyl containing reactant is formaldehyde, which polymerizes in solution to prevent it from boiling away like acetaldehyde, but which is of low molecular weight so as to add the minimum amount of hydrocarbon fuel to the cellulose.

The dialkyl phosphite is preferably the dimethyl, the diethyl or the diisopropyl phosphite. The preferred phosphite is diethyl.

An advantage of the phosphonates of the process of this invention is that they ameliorate the natural tendency of the methylolmelamines to become yellow when oxidized as, for example, when the cellulosic material is subsequently bleached during laundering.

Another advantage of the phosphonate of this process is that it is attached through the melamine and methylol moieties to the cellulose to provide a permanent attachment of the phosphorus which will resist removal by conventional washing processes.

Cellulosic material

The cellulosic material can be any type including natural, regenerated, and modified cellulosics. Examples include cotton, linen, rayon, paper, and blended fabrics containing some cellulosic fiber. The cellulosic material can be in any form including individual fibers, yarn or fabrics.

Method of treatment

The cellulosic material is ordinarily treated by applying an aqueous solution of methylolmelamine (or formaldehyde and melamine) and the α-hydroxy phosphonate (or α-hydroxy phosphonate precursors) and, if desired, a catalyst, drying the cellulosic material and thereafter heating the cellulosic material to the required reaction temperature. The molar ratio of methylolmelamine (or melamine) to the α-hydroxy phosphonate or combination of α-hydroxy phosphonate precursors is from about 2:1 to about 1:2, preferably from about 1.5:1 to about 1:1.5. The temperature of the cure is normally from about 120 C. to about 200° C., and the time of the cure is normally from about 1 minute to about 1 hour. The preferred temperature is from about 140° C. to about 170° C., with cure times of from about 3 minutes to about 20 minutes.

This reaction can be carried out with no catalyst, an acid catalyst, or a base catalyst as can be seen from the examples hereinafter.

The use of the catalyst is desirable in this reaction, but not necessary. The same catalysts are used for this reaction as for the reaction of, e.g., trimethylolmelamine with cellulose when the trimethylolmelamine is used to impart durable press properties to cellulosic materials. $NH_4OH$ is a preferred catalyst because of the properties, including feel, of the material treated.

This invention can be better understood by reference to the following examples.

In the following examples, the flame resistance of the treated cellulose was determined by the Limiting Oxygen Index (LOI [see, e.g., "Quantitative Evaluation of Flame-Retardant Cotton Finishes by the Limiting-Oxygen-Index (LOI) Technique"; John J. Willard and Richard E. Wonda; Textile Research Journal, vol. 40, No. 3, March (1970), pp. 203–210] which is determined as follows:

A 2 inch x 6 inch strip of cloth was held in a U clamp inside a tall vertical glass chimney. The cloth is ignited at the top end and at the same time nitrogen mixed with oxygen is introduced at the chimney's bottom at a controlled rate. The LOI then is the minimum oxygen concentration which permits the entire length of the sample to burn. The higher the LOI, the more difficult it is to burn the material. A material with an LOI of at least about 0.26 will normally pass the Vertical Flame Test (AATCC 34, 1966). Untreated cotton twill has an LOI of about 0.19.

EXAMPLE I

A sample of 6.4 oz. cotton twill was padded in an aqueous bath containing 15% trimethylolmelamine; 10% diethyl phosphite; 2.2% formaldehyde; and a catalyst consisting of 3% ammonium hydroxide and 1% potassium carbonate. The fabric was squeezed to a 100% wet-pick-up, dried for 10 minutes at a temperature of 80° C. and cured for an additional 10 minutes at a temperature of 150° C. The flammability of the cotton twill after treatment and one standard wash with a standard commercial detergent ("Tide"), was determined by the Limiting Oxygen Index method (LOI) to be .30.

EXAMPLE II

In the following table, 6.4 oz. cotton twill was padded in an aqueous bath containing the indicated concentrations of trimethylolmelamine (TMM); diethyl phosphite (DEP); formaldehyde; and catalyst where indicated. The fabric was squeezed to an approximately 100% wet-pick-up, dried at the indicated temperature for the indicated time and cured for the indicated time at the indicated temperature. The cotton twill after being washed one time with a commercial detergent ("Tide"), had the indicated LOI's.

TABLE 1

| Run number | Percent TMM | Percent DEP | Percent CH$_2$O | Catalyst | Drying Time | Drying Temp., °C | Cure Time | Cure Temp., °C | LOI after 1 wash |
|---|---|---|---|---|---|---|---|---|---|
| 1 | 15 | 20 | 4.4 | | 10 | 80 | 10 | 150 | .30 |
| 2 | 15 | 20 | 11.8 | | 10 | 80 | 10 | 150 | .27 |
| 3 | 15 | 20 | 3.4 | 2.0% Zn(NO$_3$)$_2$ | 10 | 80 | 5 | 150 | .29 |
| 4 | 15 | 20 | 3.4 | 2.0% Zn(NO$_3$)$_2$ | 10 | 80 | 10 | 150 | .25 |
| 5 | 10 | 15 | 3.4 | 2.0% ammonium phosphate | 10 | 80 | 10 | 150 | .34 |
| 6 | 10 | 20 | 3.4 | do | 10 | 80 | 10 | 150 | .28 |
| 7 | 20 | 15 | 3.4 | | 10 | 80 | 10 | 150 | .28 |
| 8 | 20 | 20 | 4.4 | | 10 | 80 | 10 | 150 | .28 |
| 9 | 25 | 10 | 2.28 | | 10 | 80 | 10 | 150 | .29 |
| 10 | 25 | 15 | 3.4 | | 10 | 80 | 10 | 150 | .30 |
| 11 | 25 | 20 | 4.4 | | 10 | 80 | 10 | 150 | .30 |
| 12 | 15 | 10 | 2.2 | 1.9% MgSO$_4$·7H$_2$O; 1.1% NaH$_2$PO$_4$·H$_2$O | 10 | 80 | 10 | 150 | .25 |
| 13 | 20 | 15 | None | 3.5% Cu(ClO$_4$)$_2$ | 10 | 80 | 10 | 150 | .28 |
| 14 | 15 | 10 | 2 | 3.5%/6.7% NH$_4$OH | 10 | 80 | 10 | 150 | .25 |
| 15 | 15 | 10 | 2 | 6.7% NH$_4$OH | 10 | 80 | 10 | 150 | .27 |
| 16 | 15 | 10 | 2 | 3.5% Cu(ClO$_4$)$_2$ | 10 | 80 | 10 | 150 | .28 |
| 17 | 15 | 10 | 2 | 3.5% Cu(ClO$_4$)$_2$; 6.7% NH$_4$OH | 10 | 80 | 10 | 150 | .28 |
| 18 | 15 | 10 | 2 | 3.5% Cu(NO$_3$)$_2$ | 10 | 80 | 10 | 150 | .29 |
| 19 | 15 | 10 | 2 | 6.7% NH$_4$OH; 3.5% Zn(NO$_3$)$_2$ | 10 | 80 | 10 | 150 | .30 |
| 20 | 15 | 10 | 2 | 6.7% NH$_4$OH; 3.5% CuCl$_2$ | 10 | 80 | 10 | 150 | .30 |
| 21 | 15 | 10 | 2 | 6.7% NH$_4$OH; 3.5% ZnCl$_2$ | 10 | 80 | 10 | 150 | .26 |
| 22 | 15 | 20 | 2 | 15% NH$_4$OH | 10 | 80 | 10 | 150 | .31 |
| 23 | 15 | 15 | 3.3 | 6.7% NH$_4$OH | 10 | 80 | 10 | 150 | .29 |
| 24 | 20 | 15 | 3.3 | 6.7% NH$_4$OH | 10 | 80 | 10 | 150 | .32 |

EXAMPLE III

In the following table, 6.4 oz. cotton twill was padded in an aqueous bath containing the indicated concentrations of trimethylolmelamine (TMM); diethyl phosphite (DEP); formaldehyde; and catalyst where indicated. The fabric was squeezed to an approximately 80% wet-pick-up, dried at the indicated temperature for the indicated time and cured for the indicated time at the indicated temperature. The cotton twill after being washed one time with a commercial detergent, i.e., "Tide," had the indicated LOI's.

EXAMPLE IV

Samples of 6.4 oz. cotton twill were padded in an aqueous bath containing about 25% tetramethyl ethane-1-hydroxy-1,1-diphosphonate; about 10% trimethylolmelamine; 3% Aerotex Catalyst #5, a commercially available catalyst; and about 62% water. The fabric was squeezed to approximately 80% wet-pick-up; dried and then cured for 30 minutes at 150° C. The cloth was then subjected to a series of standard wash-dry cycles, using a standard detergent, i.e., "Tide." After each drying step, a sample of cloth was removed and its flammability

TABLE 2

| Run number | Percent TMM | Percent DEP | Percent CH$_2$O | Catalyst | Drying Time | Drying Temp., °C | Cure Time | Cure Temp., °C | LOI after 1 wash |
|---|---|---|---|---|---|---|---|---|---|
| 1 | 10 | 30 | 6.5 | None | 10 | 80 | 10 | 150 | .27 |
| 2 | 15 | 30 | 6.5 | do | 10 | 80 | 10 | 150 | .29 |
| 3 | 20 | 30 | 6.5 | do | 10 | 80 | 10 | 150 | .30 |
| 4 | 25 | 30 | 6.5 | do | 10 | 80 | 10 | 150 | .32 |
| 5 | 15 | 5 | 1.1 | do | 10 | 80 | 10 | 150 | .25 |
| 6 | 15 | 10 | 2.2 | do | 10 | 80 | 10 | 150 | .28 |
| 7 | 15 | 15 | 3.3 | do | 10 | 80 | 10 | 150 | .28 |
| 8 | 15 | 20 | 4.4 | do | 10 | 80 | 10 | 150 | .28 |
| 9 | 20 | 5 | 1.1 | do | 10 | 80 | 10 | 150 | .28 |
| 10 | 20 | 10 | 2.2 | do | 10 | 80 | 10 | 150 | .29 |
| 11 | 15 | 10 | 2.2 | do | 10 | 80 | 10 | 140 | .27 |
| 12 | 15 | 10 | 2.2 | do | 10 | 80 | 20 | 140 | .27 |
| 13 | 15 | 10 | 2.2 | do | 10 | 80 | 5 | 150 | .28 |
| 14 | 15 | 10 | 2.2 | do | 10 | 80 | 10 | 150 | .29 |
| 15 | 15 | 10 | 2.2 | do | 10 | 80 | 20 | 150 | .27 |
| 16 | 15 | 10 | 2.2 | do | 10 | 80 | 5 | 160 | .27 |
| 17 | 15 | 10 | 2.2 | do | 10 | 80 | 10 | 160 | .27 |
| 18 | 15 | 10 | 2.2 | do | 10 | 80 | 20 | 160 | .28 |
| 19 | 15 | 10 | 2.2 | 3% Zn(NO$_3$)$_2$ | 10 | 80 | 5 | 140 | .27 |
| 20 | 15 | 10 | 2.2 | 3% Zn(NO$_3$)$_2$ | 10 | 80 | 10 | 140 | .27 |
| 21 | 15 | 10 | 2.2 | 3% Zn(NO$_3$)$_2$ | 10 | 80 | 5 | 150 | .25 |
| 22 | 15 | 10 | 2.2 | 3% Zn(NO$_3$)$_2$ | 10 | 80 | 10 | 150 | .27 |
| 23 | 15 | 10 | 2.2 | 3% Zn(NO$_3$)$_2$ | 10 | 80 | 5 | 160 | .26 |
| 24 | 15 | 10 | 2.2 | 3% Zn(NO$_3$)$_2$ | 10 | 80 | 10 | 160 | .28 |
| 25 | 15 | 15 | 3.3 | 3% Zn(NO$_3$)$_2$ | 10 | 80 | 5 | 140 | .26 |
| 26 | 15 | 15 | 3.3 | 3% Zn(NO$_3$)$_2$ | 10 | 80 | 10 | 140 | .28 |
| 27 | 15 | 15 | 3.3 | 3% Zn(NO$_3$)$_2$ | 10 | 80 | 10 | 150 | .28 |
| 28 | 15 | 15 | 3.3 | 3% Zn(NO$_3$)$_2$ | 10 | 80 | 5 | 150 | .26 |
| 29 | 15 | 15 | 3.3 | 3% Zn(NO$_3$)$_2$ | 10 | 80 | 5 | 160 | .28 |
| 30 | 15 | 15 | 3.3 | 3% Zn(NO$_3$)$_2$ | 10 | 80 | 10 | 160 | .27 |
| 31 | 15 | 15 | 0 | None | 10 | 80 | 10 | 150 | .26 |
| 32 | 15 | 15 | .33 | do | 10 | 80 | 10 | 150 | .26 |
| 33 | 15 | 15 | .99 | do | 10 | 80 | 10 | 150 | .28 |
| 34 | 15 | 15 | 1.66 | do | 10 | 80 | 10 | 150 | .28 | measured by the LOI technique. The results are recorded below. Flame retardancy was found to be durable to more than 50 washes.

| Washes: | LOI |
|---|---|
| 0 | .37–.40 |
| 1 | .28–.31 |
| 3 | .31 |
| 6 | .28–.31 |
| 10 | .28–.31 |
| 15 | .28–.29 |
| 20 | .29 |
| 30 | .28 |
| 50 | .26 |

EXAMPLE V

A solution containing 20% dimethyl ethane-1-hydroxy-1-phosphonate; 15% trimethylolmelamine; 3% zinc nitrate; and 62% water was applied to 6.4 oz. cotton twill to give about 80% wet-pick-up. This cloth was then dried for 10 minutes at about 85° C.; cured for about 10 minutes at 150° C. and then subjected to a series of standard wash-dry cycles using a commercially available detergent, i.e., "Tide." After each drying step, a sample of the cloth was removed; and its flammability measured by the LOI technique. The results are recorded below. Flame retardancy was found to be durable to more than 15 washes.

| Washes: | LOI |
|---|---|
| 0 | .35 |
| 1 | .32 |
| 3 | .30 |
| 6 | .30 |
| 10 | .29 |
| 15 | .27 |

EXAMPLE VI

In the following runs, 6.4 oz. cotton twill was treated with an aqueous solution prepared by dissolving 15 g. of trimethylolmelamine in 62 g. of warm water with stirring, adding 20 g. of the indicated dimethyl α-hydroxy-monophosphonate esters, and then adding 3 g. of Aerotex Accelerator No. 5, a commercially available catalyst. The solution was padded onto the cotton twill to 80% wet-pick-up. The cloth was then dried at 80° C. for 10 minutes and cured at 150° C. for 10 minutes. The cloth was then washed in a standard commercial detergent, i.e., "Tide," and flammability was determined by LOI. The table below gives results for the indicated α-hydroxy phosphonates.

| α-Hydroxy phosphonate | LOI after wash |
|---|---|
| $CH_3-\underset{\underset{CH_3}{\|}}{\overset{\overset{OH}{\|}}{C}}-PO_3(CH_3)_2$ | .31 |
| $C_6H_5-\underset{\underset{H}{\|}}{\overset{\overset{OH}{\|}}{C}}-PO_3(CH_3)_2$ | .28 |
| $CH_3-CH_2-\underset{\underset{H}{\|}}{\overset{\overset{OH}{\|}}{C}}-PO_3(CH_3)_2$ | .27 |
| $CH_2=CH-\underset{\underset{CH_3}{\|}}{\overset{\overset{OH}{\|}}{C}}-PO_3(CH_3)_2$ | .27 |
| $CH_3-\overset{\overset{O}{\|\|}}{C}-\underset{\underset{}{\|}}{\overset{\overset{OH}{\|}}{C}H}-PO_3(CH_3)_2$ | .28 |
| $CH_3-\overset{\overset{O}{\|\|}}{C}-CH_2-\underset{\underset{H}{\|}}{\overset{\overset{OH}{\|}}{C}}-PO_3(CH_3)_2$ | .27 |
| $H-\underset{\underset{H}{\|}}{\overset{\overset{OH}{\|}}{C}}-PO_3(CH_3)_2$ | .29 |

Substantially equivalent results are obtained when in the above examples a mixture of dimethyl phosphite and the following carbonyl containing reactants are substituted on a molar equivalent basis for the indicated α-hydroxy phosphonates: acetone, benzaldehyde, propionaldehyde, methylvinyl ketone, biacetyl and glyoxal. (Where the materials are volatile, the pressure is raised to prevent vaporization.)

EXAMPLE VII

Samples of 80″ x 80″ cotton print cloths were treated with the following solutions, squeezed to a 100% pick up, dried for 10 minutes at 80° C., and cured for 10 minutes at 150° C. The samples were laundered in a conventional way with a commercial detergent, i.e., "Tide," dried, and their flammability determined by the LOI method.

| Run number | Bath Percent TMM | Percent DEP | Percent CH$_2$O | Catalyst | LOI after wash |
|---|---|---|---|---|---|
| 1 | 15 | 20 | 4.3 | 3% MgCl$_2$ | .28 |
| 2 | 20 | 20 | 4.3 | 3% MgCl$_2$ | .28 |
| 3 | 15 | 20 | 4.3 | 3% Zn(NO$_3$)$_2$ | .28 |
| 4 | 15 | 20 | 4.3 | 3% Acc #5* | .28 |
| 5 | 15 | 20 | 4.3 | None | .26 |

*Aerotex Accelerator #5: a commercially available catalyst.

EXAMPLE VIII

Cotton flannel weighing about 4.7 oz. per square yard and napped on both sides was treated with the following solutions, squeezed to 125% wet-pick-up, dried for 10 minutes at 80° C., and cured for 10 minutes at 150° C. Treated samples of the cloth were then laundered in a normal washing step with a conventional detergent, i.e., "Tide," dried, and their flammability determined by the LOI method. The results were as follows:

| Run number | Bath Percent TMM | Percent DEP | Percent CH$_2$O | Catalyst | LOI after wash |
|---|---|---|---|---|---|
| 1 | 15 | 15 | 3.3 | 3% Zn(NO$_3$)$_2$ | .27 |
| 2 | 20 | 15 | 3.3 | 3% Zn(NO$_3$)$_2$ | .28 |
| 3 | 20 | 20 | 4.3 | 3% Zn(NO$_3$)$_2$ | .27 |
| 4 | 15 | 20 | 4.3 | None | .26 |

EXAMPLE IX

Aqueous solutions of methylolmelamines were prepared by heating various melamine/formaldehyde mixtures as set forth in the following table to 85–90° C. for 30 minutes in the presence of an NaOH catalyst. The solutions were cooled to room temperature and the diethyl phosphite and the indicated catalyst were added to form the indicated bath solutions.

Samples of 6.4 oz./sq. yd. cotton twill were padded with their solutions to a 100% wet-pick-up, dried 10 minutes at 80° C., and cured 10 minutes at 150° C. All samples were given one detergent wash (Tide) and the flammability determined by the LOI method.

| CH₂O/ melamine ratio | Bath | | | Catalyst used (3%) | LOI |
|---|---|---|---|---|---|
| | Percent CH₂O | Percent melamine | Percent DEP | | |
| 2/1 | 4.8 | 10.1 | 15.0 | NH₄OH | .28 |
| 2/1 | 4.8 | 10.1 | 15.0 | Catalyst A.C.* | .27 |
| 3/1 | 6.3 | 8.8 | 15.0 | NH₄OH | .29 |
| 3/1 | 6.3 | 8.8 | 15.0 | Catalyst A.C.* | .27 |
| 4/1 | 7.3 | 7.7 | 15.0 | NH₄OH | .28 |
| 4/1 | 7.3 | 7.7 | 15.0 | Catalyst A.C.* | .26 |

*Catalyst A.C. is a commercial catalyst available from the Monsanto Company.

EXAMPLE X

Samples of 6.4 oz./sq. yd. cotton twill were padded to an 80% wet-pick-up, dried at 80° C. for 10 minutes, and cured at 150° C. for 10 minutes. All samples were washed once in a standard detergent wash (Tide) and the flammability determined by the LOI method.

| Run number | Percent TMM | Percent HOCH₂PO₃(C₂H₅)₂ | Catalyst | LOI after 1 wash |
|---|---|---|---|---|
| 1 | 20 | 24.3 | None | .34 |
| 2 | 15 | 18.2 | 3% Zn(NO₃)₂ | .26 |
| 3 | 15 | 18.2 | None | .27 |
| 4 | 20 | 24.3 | do | .33 |
| 5 | 20 | 18.2 | do | .30 |
| 6 | 15 | 24.3 | do | .28 |
| 7 | 20 | 18.2 | {3% (NH₄)₂HPO₄ / 4% urea} | .27 |

EXAMPLE XI

A cloth sample of 50/50, Cotton/Polyester (Dacron) was padded to a 100% wet-pick-up with an aqueous bath containing 24.3% diethyl methane hydroxy monophosphonate, 20% trimethylolmelamine, and 4% Zn(NO₃)₂ catalyst. The fabric was dried 10 minutes at 80° C., cured 10 minutes at 150° C., and given a standard detergent wash (Tide). The flammability of the cloth was .26 as determined by the LOI method.

What is claimed is:

1. A process for making cellulosic materials flame resistant comprising the steps of:
   (I) Contacting said cellulosic material with an aqueous solution containing:
   (A) A phosphorus source selected from the group consisting of:
   (1) From about 2% to about 80% of a compound having the formula:

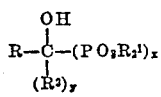

wherein R and R² are each selected from the group consisting of hydrogen, alkyl groups containing from 1 to about 6 carbon atoms, phenyl, acyl groups containing from 2 to about 6 carbon atoms, and acyl alkyl groups containing from 3 to about 6 carbon atoms; R¹ is an alkyl group containing from 1 to about 3 carbon atoms; x is a number from 1 to 2; and y is a number which when added to x gives 2; and
   (2) A mixture of:
   (a) from about 1% to about 40% of a carbonyl containing compound having the formula:

$$R^3—CO—R^4$$

wherein R³ and R⁴ are selected from the group consisting of hydrogen, phenyl, alkyl groups containing from 2 to about 6 carbon atoms, acyl groups containing from 2 to about 6 carbon atoms, and acyl alkyl groups containing from 3 to about 6 carbon atoms, the total number of carbon atoms in said compound being no greater than about 8; and
   (b) from about 1% to about 40% of a dialkyl phosphite, wherein said alkyl groups contain from 1 to about 3 carbon atoms; and
   (B) From about 5% to about 50% of mixtures of melamine and from about 2 to about 6 moles of formaldehyde per mole of melamine;
   (II) Drying said cellulosic material; and
   (III) Heating said cellulosic material to a temperature of from about 120° C. to about 200° C. for a time of from about 1 minute to about 1 hour to effect the cure and produce a durably flame-resistant cellulose.

2. The process of claim 1 which is carried out in the presence of a catalyst selected from the group consisting of an acid catalyst and a base catalyst.

3. The process of claim 1 wherein the phosphorus source is a mixture of formaldehyde and diethylphosphite.

4. The process of claim 1 wherein the molar ratio of melamine to α-hydroxy phosphonate is from about 1.5:1 to about 1:2.

5. The process of claim 4 wherein the molar ratio of melamine to α-hydroxy phosphonate is from about 1.5:1 to about 1:1.5.

6. The process of claim 1 wherein the cure is effected by heating the cellulosic material to a temperature of from about 140° C. to about 170° C. for a time of from about 3 minutes to about 20 minutes.

7. The process of claim 1 wherein the cellulosic material is selected from the group consisting of cotton, linen, rayon, paper and blended fabrics containing cellulosic fibers.

8. The durably flame-resistant cellulosic material prepared by the process of claim 1.

References Cited
UNITED STATES PATENTS

| | | | |
|---|---|---|---|
| 3,092,651 | 6/1963 | Friedman | 260—953 X |
| 2,579,810 | 12/1951 | Fields | 260—953 X |
| 3,515,776 | 6/1970 | Baranauckas | 260—953 X |
| 2,494,862 | 1/1950 | Craig et al. | 260—953 X |
| 2,810,701 | 10/1957 | Reeves et al. | 8—116.2 X |
| 3,247,015 | 4/1966 | Zimmerman et al. | 117—136 X |
| 2,832,745 | 4/1958 | Hechenbleikner | 117—136 X |
| 2,828,228 | 3/1958 | Glade et al. | 117—136 |

GEORGE F. LESMES, Primary Examiner

H. WOLMAN, Assistant Examiner

U.S. Cl. X.R.

8—116, 116.3; 117—136